June 24, 1930.  C. C. SPREEN  1,767,413
SEAL FOR COMPRESSORS
Filed April 22, 1927
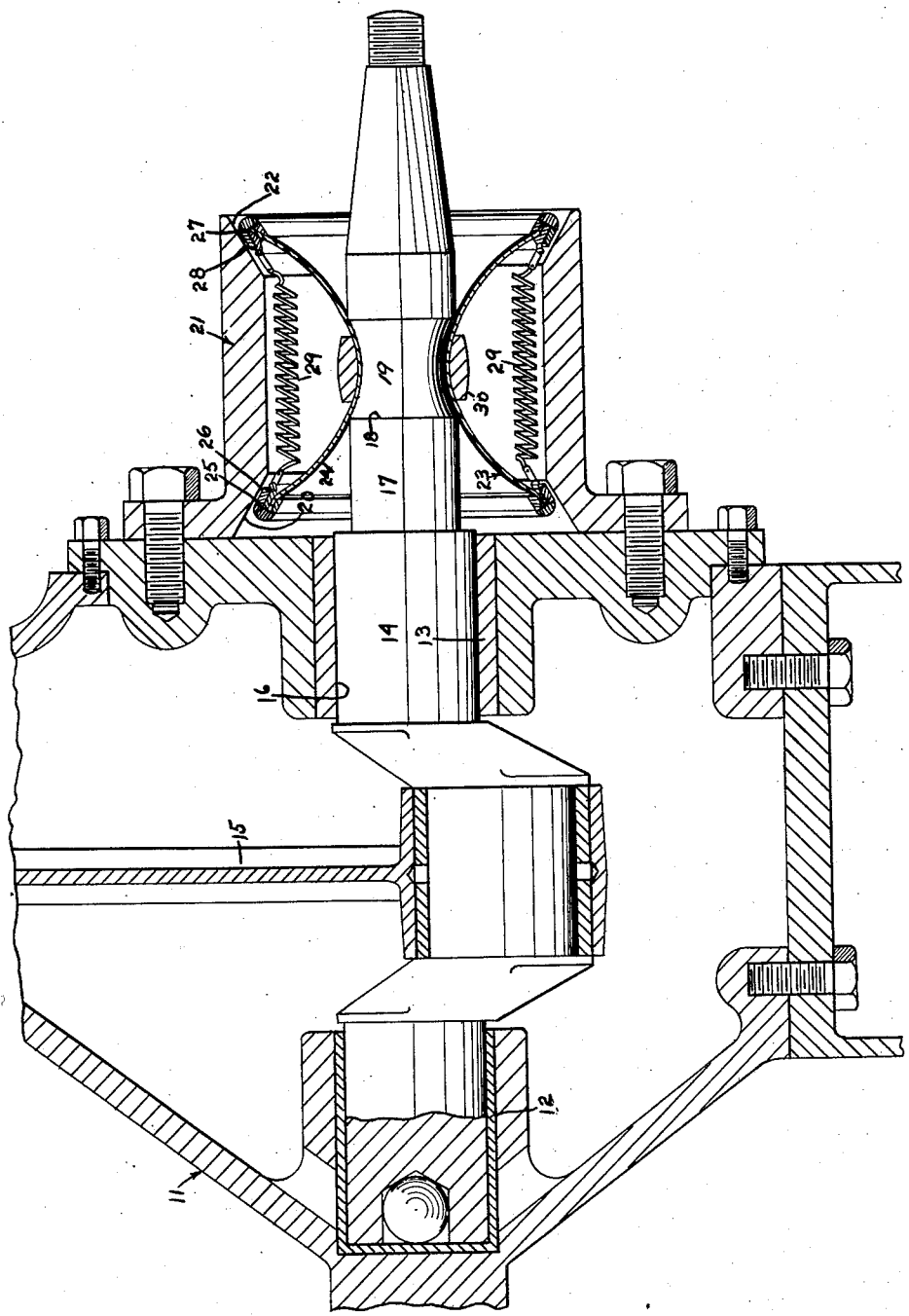
Charles C. Spreen
Inventor
By  *Wayne M. Hart*
Attorney Patented June 24, 1930

1,767,413

UNITED STATES PATENT OFFICE

CHARLES C. SPREEN, OF DETROIT, MICHIGAN

SEAL FOR COMPRESSORS

Application filed April 22, 1927. Serial No. 185,785.

My invention relates to seals for compressors, and particularly to means for sealing the drive shaft aperture in the casing of a refrigerant compressor, and the principal object of my invention is to provide new and improved means for this purpose. In the drawings accompanying this specification and forming a part of this application I have shown, for the purpose of illustration, one form which my invention may assume, and in these drawings the single figure is a fragmentary central vertical section through a compressor showing the embodiment of my invention herein disclosed.

In the embodiment of my invention herein shown the lower portion of the compressor casing 11 is provided with a closed bearing 12 and an open-end bearing 13 arranged to jointly support a crank shaft 14 which receives between the bearings 12 and 13 the usual connecting rod 15, and which projects beyond the open-end bearing 13 through a suitable aperture 16 in the casing 11, and is provided exteriorly of the casing 11 with a reduced extension 17 forming an annular shoulder 18, provided with a recessed portion 19, and adapted to receive a suitable driving connection, not shown; and the casing 11 is provided with an annular casing extension having a frusto-conical casing seat 20 surrounding the aperture 16 and the crank shaft 14 passing therethrough, and with the annular extension 21 carrying a second frusto-conical casing seat 22 also surrounding the aperture 16 and the crank shaft 14 passing therethrough.

Closing the aperture 16, particularly to prevent both the egress of refrigerant and the ingress of moisture, is a seal 23 herein shown as comprising: a flexible annular diaphragm 24 having its one end attached to a base 25 having a frusto-conical surface 26 formed complementary to the frusto-conical seat 20 and adapted to be held in rotary sealing engagement with the frusto-conical casing seat 20, and having its other end sealed to a base 27 having a frusto-conical surface 28 formed complementary to the frusto-conical seat 22 and adapted to be held in rotary sealing engagement with the seat 22; springs 29 tensioned between the bases 25 and 27 effective to hold the surfaces 26 and 28 in rotary sealing engagement with the seats 20 and 22; and a ring 30 fixedly sealing the central portion of the diaphragm 24 to the recessed portion 19 of the exterior 17 of the shaft 14.

From the above description it will be obvious to those skilled in the art that I have provided a seal rotating with the crank shaft and doubly sealing the shaft aperture in the casing, and under these circumstances it will be apparent to those skilled in the art that the embodiment of my invention herein shown accomplishes at least the principal object of my invention.

At the same time, it also will be obvious to those skilled in the art that the embodiment of my invention herein shown and described may be variously changed and modified without departing from the spirit of my invention or sacrificing the advantages thereof, and it therefore will be understood that the disclosure herein is illustrated only, and that my invention is not limited thereto.

I claim:

1. The combination with a compressor casing having an aperture, a plate provided with a bearing, said plate being adapted to close the aperture in said casing, and a shaft extending beyond said plate; of a seal structure comprising an annular extension secured to said plate, seats formed on said extension at each end thereof, a tubular diaphragm secured to said shaft, and means for resiliently sealing the ends of said diaphragm to said seats on said extension.

2. The combination with a compressor casing having an aperture, a plate provided with a bearing, said plate being adapted to close the aperture in said casing, and a shaft provided with a recessed portion extending beyond said plate; of a seal structure comprising an annular extension secured to said plate, frusto-conical seats formed on said extension at each end thereof, a tubular double frusto-conical diaphragm secured to the recessed portion in said shaft, a ring for fixedly sealing said diaphragm to said shaft, frusto-conical bases secured to the ends of said diaphragm, and springs disposed parallel to said shaft and having one end attached to each of said bases.

In testimony whereof I hereunto affix my signature.

CHARLES C. SPREEN.